(12) United States Patent
Sergyeyenko et al.

(10) Patent No.: US 10,537,057 B2
(45) Date of Patent: Jan. 21, 2020

(54) SPOOL ASSEMBLY FOR A TRIMMER HEAD

(71) Applicant: BLACK & DECKER INC., New Britain, CT (US)

(72) Inventors: Oleksiy Sergyeyenko, Baldwin, MD (US); Matthew Rosenthal, Towson, MD (US)

(73) Assignee: Black & Decker, Inc., New Britain, CT (US)

( * ) Notice: Subject to any disclaimer, the term of this patent is extended or adjusted under 35 U.S.C. 154(b) by 127 days.

(21) Appl. No.: 15/478,726

(22) Filed: Apr. 4, 2017

(65) Prior Publication Data

US 2018/0279547 A1 Oct. 4, 2018

(51) Int. Cl.
*A01D 34/416* (2006.01)

(52) U.S. Cl.
CPC ..... *A01D 34/4166* (2013.01); *A01D 34/4163* (2013.01); *A01D 34/4167* (2013.01)

(58) Field of Classification Search
CPC ............ A01D 34/4166; A01D 34/4163; A01D 34/4165; A01D 34/4167; A01D 34/73; A01D 34/416
USPC .............................................. 30/276; 56/12.7
See application file for complete search history.

(56) References Cited

U.S. PATENT DOCUMENTS

| 4,185,381 | A | * | 1/1980 | Palmieri ............ A01D 34/4163 30/347 |
| 4,189,830 | A | | 2/1980 | Pittinger |
| 4,189,833 | A | | 2/1980 | Kwater |
| 4,203,212 | A | | 5/1980 | Proulx |
| 4,274,201 | A | | 6/1981 | Oberg et al. |
| 4,362,074 | A | * | 12/1982 | Kwater ............ A01D 34/4163 83/13 |
| 4,419,822 | A | | 12/1983 | Harris |
| 4,633,588 | A | | 1/1987 | Pittinger, Jr. |
| 4,656,739 | A | | 4/1987 | Pittinger, Jr. |
| 4,882,843 | A | | 11/1989 | Baba |
| 5,020,223 | A | | 6/1991 | Desent et al. |
| 5,339,526 | A | | 8/1994 | Everts |
| 5,490,641 | A | | 2/1996 | Worthing |
| 5,671,536 | A | | 9/1997 | Everts et al. |
| 5,749,148 | A | | 5/1998 | White, III et al. |

(Continued)

FOREIGN PATENT DOCUMENTS

EP 2923549 A1 * 9/2015 ......... A01D 34/4163
WO WO2008053508 5/2008

(Continued)

OTHER PUBLICATIONS

EP Search Report dated Jul. 11, 2018, for EP Application No. 18161537.

*Primary Examiner* — Ghassem Alie
*Assistant Examiner* — Nhat Chieu Q Do
(74) *Attorney, Agent, or Firm* — John Yun

(57) ABSTRACT

A spool assembly includes a spool formed of a central section including a core wall containing a core and passages extending through the core wall, an upper flange located at an upper portion of the central section, a lower flange located at a lower portion of the central section, and a protrusion section integral with the central section and extending above the upper flange. The protrusion section includes a cut-out formed inside the protrusion section, the cut-out having a non-circular shape adapted to be securely engaged to a drive member of a motor.

13 Claims, 11 Drawing Sheets

(56) References Cited

U.S. PATENT DOCUMENTS

| | | |
|---|---|---|
| 5,765,287 A | 6/1998 | Griffini et al. |
| 5,806,192 A | 9/1998 | Everts et al. |
| 5,881,464 A | 3/1999 | Collins et al. |
| 5,881,465 A | 3/1999 | Brant et al. |
| 5,906,051 A | 5/1999 | Nannen |
| 6,148,523 A | 11/2000 | Everts et al. |
| 6,263,580 B1 | 7/2001 | Stark et al. |
| 6,279,235 B1 | 8/2001 | White, III et al. |
| 6,952,877 B2 * | 10/2005 | Pfaltzgraff ......... A01D 34/4163 30/276 |
| 7,275,324 B2 | 10/2007 | Proulx |
| 7,412,768 B2 | 8/2008 | Alliss |
| 7,513,046 B2 | 4/2009 | Proulx |
| 7,581,322 B2 | 9/2009 | Proulx |
| 7,607,232 B2 | 10/2009 | Pfaltzgraff |
| 7,762,002 B2 | 7/2010 | Proulx |
| 77,977,839 | 9/2010 | Proutx |
| 7,882,642 B2 | 2/2011 | Proulx |
| 7,979,991 B2 | 7/2011 | Pfaltzgraff |
| 8,025,249 B2 | 9/2011 | Alliss et al. |
| 8,176,639 B2 | 5/2012 | Doane et al. |
| 8,230,602 B2 | 7/2012 | Arnetoli |
| 2002/0189107 A1 | 12/2002 | Arnetoli |
| 2009/0172955 A1 | 7/2009 | Brower et al. |
| 2010/0180451 A1 | 7/2010 | Morris et al. |
| 2011/0214295 A1 | 9/2011 | Proulx |
| 2011/0214301 A1 | 9/2011 | Proulx |
| 2011/0302791 A1 | 12/2011 | Proulx |
| 2013/0133208 A1 | 5/2013 | Skinner |
| 2018/0271011 A1 * | 9/2018 | Zenkus .............. A01D 34/4165 |
| 2018/0271012 A1 * | 9/2018 | Guo ................... A01D 34/4166 |

FOREIGN PATENT DOCUMENTS

| | | |
|---|---|---|
| WO | WO2013138752 | 9/2013 |
| WO | WO2016120140 | 8/2016 |
| WO | WO-2017124865 A1 * | 7/2017 ........... A01D 34/416 |

* cited by examiner

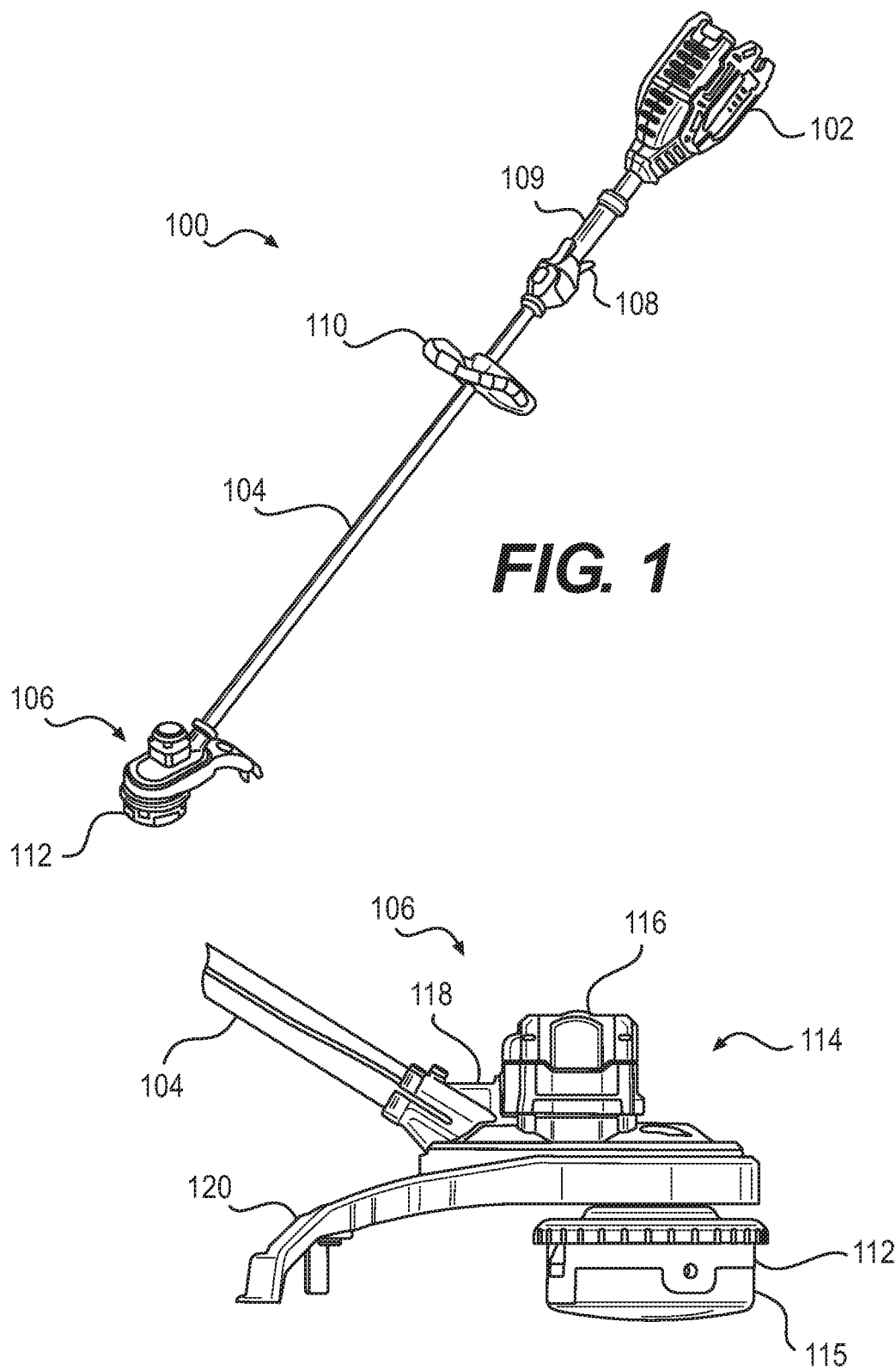

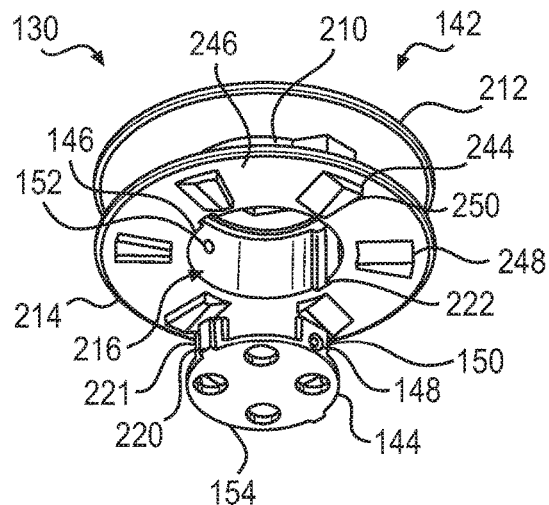
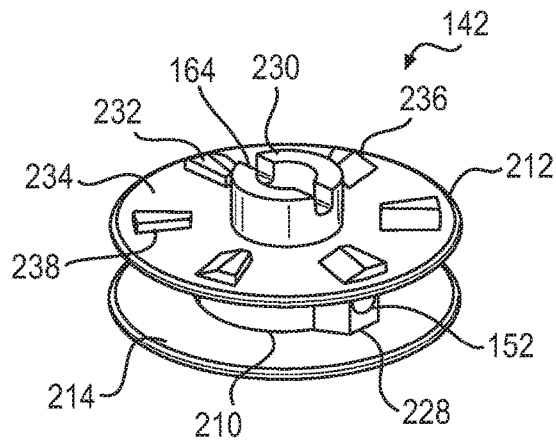
*FIG. 5A*  *FIG. 5B*
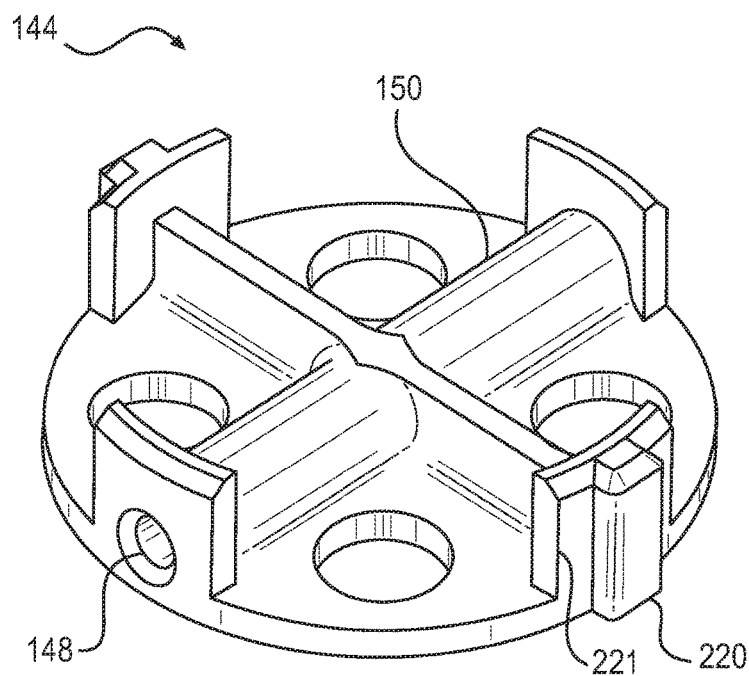
*FIG. 5C*

SPOOL ASSEMBLY FOR A TRIMMER HEAD

FIELD

The present disclosure relates to a string trimmer head. In particular, the present disclosure relates to a spool assembly for a string trimmer head.

BACKGROUND

Cutting devices used to cut vegetation using radially projecting flexible cutting lines, which are known as string trimmers, are in wide use both by individual users and commercial landscapers. String trimmers are typically used to trim vegetation along areas that are unreachable by lawnmowers as well as to trim borders and smaller patches of grass. The cutting lines are typically wound around a spool, which is mounted to a string trimmer's drive line, and are fed from the spool as additional lengths of the cutting lines are needed. A housing is typically provided around the spool to protect the spool and the cutting line and portions of the cutting line extend through openings in the housing to be used in trimming operations.

SUMMARY

This section provides a general summary of the disclosure, and is not a comprehensive disclosure of its full scope or all of its features.

A spool assembly includes a spool formed of a central section including a core wall containing a core and passages extending through the core wall, an upper flange located at an upper portion of the central section, a lower flange located at a lower portion of the central section, and a protrusion section integral with the central section and extending above the upper flange. The protrusion section includes a cut-out formed inside the protrusion section, the cut-out having a non-circular shape adapted to be securely engaged to a drive member of a motor.

A string trimmer head includes a spool to couple to a drive member of a string trimmer and to be continuously rotated with the rotation of the drive member around an axis. The spool includes a central section formed of a core wall around a core and passages extending through the core wall, an upper flange located at an upper portion of the central section, and a lower flange located at a lower section of the central section. An end cap is inserted into an opening to the core, in which the end cap has a protrusion that extends from one side of the end cap to the other side of the end cap and includes a passageway that is aligned with the passages in the core wall. A spool housing surrounds the spool and is to releasably engage the spool, in which the spool housing is to rotate with the spool when engaged with the spool and to not rotate with the spool when disengaged from the spool, the spool housing including an eyelet through which a line wound around the spool is to extend. A spring is provided to control the releasable engagement between the spool housing and the spool, in which the spring is to bias the spool housing away from the spool.

A string trimmer includes a pole having a handle on a first end and a trimmer head assembly on a second end, the trimmer head assembly having a motor with a drive member. The drive member is fixedly connected to a spool through a fastener having a head and the spool has a protrusion section integral with and extending from a central section. The protrusion section has a cut-out formed in the interior of the protrusion section and a complementary shape to the fastener head to cause the spool to be continuously rotated with the rotation of the drive member around an axis. The spool also includes a central section formed of a core wall around a core and passages extending through the core wall on opposites sides of the core. A spool housing surrounds the spool and is to releasably engage the spool, in which the spool housing is to rotate with the spool when engaged with the spool and to not rotate with the spool when disengaged from the spool. The spool housing also includes an eyelet through which a line wound around the spool is to extend. A spring is provided to control the releasable engagement between the spool housing and the spool.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Features of the present disclosure are illustrated by way of example and not limited in the following figure(s), in which like numerals indicate like elements, in which:

FIG. 1 shows a perspective view of a string trimmer according to an example of the present disclosure;

FIG. 2 shows a side view of the trimmer head housing and the trimmer head depicted in FIG. 1;

FIGS. 5A-5C, respectively, depict a bottom perspective view of the spool assembly shown in FIGS. 3 and 4B-4D, a top perspective view of the spool shown in FIGS. 3 and 4B-4D, and a top perspective view of the end cap shown in FIGS. 3 and 4B-4D;

DETAILED DESCRIPTION

Figure 3:
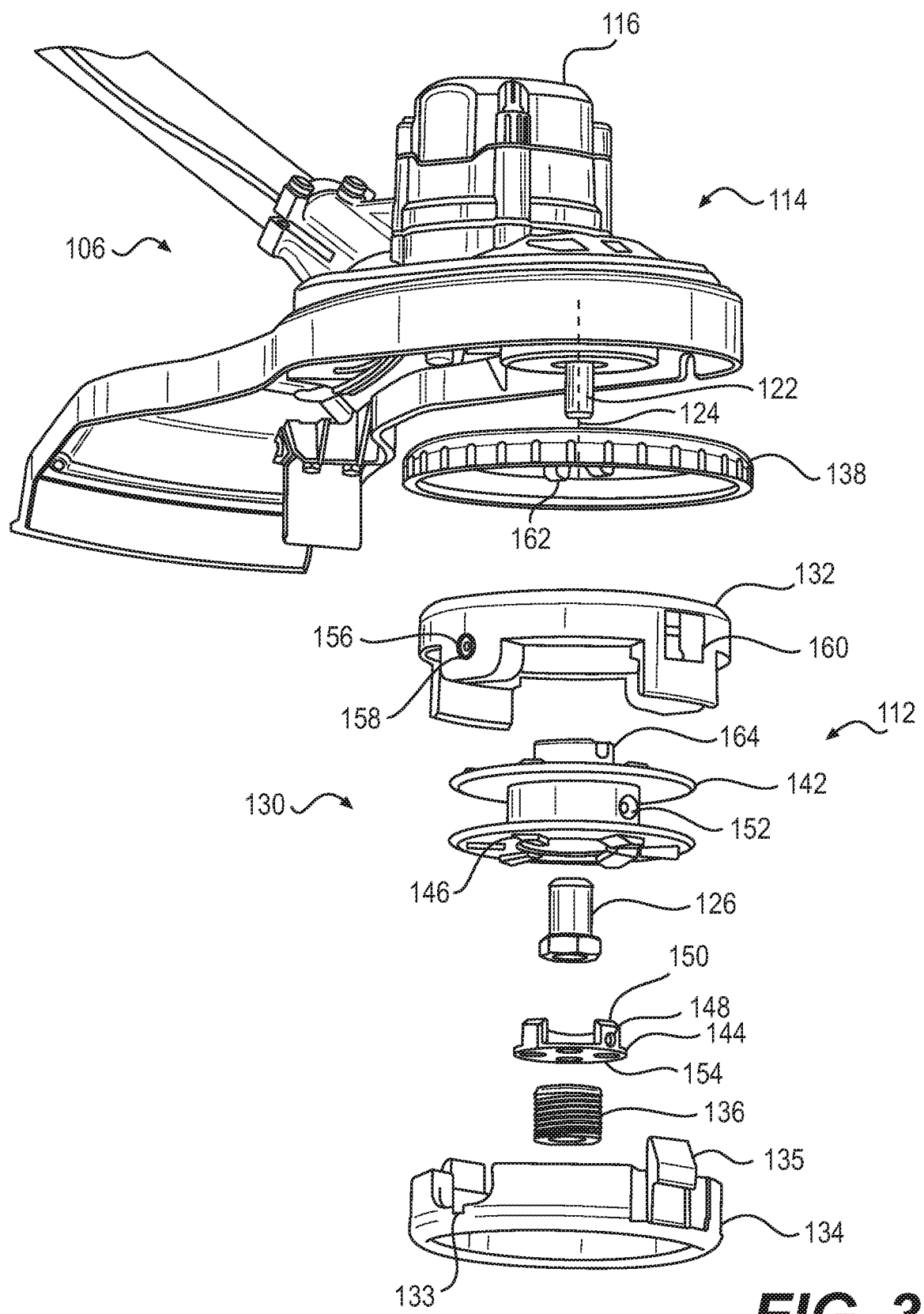
FIG. 3 depicts a perspective view of the trimmer head housing and an exploded perspective view of the trimmer head shown in FIGS. 1 and 2.

Disclosed herein are spool assemblies and string trimmer heads containing spool assemblies. The spool assemblies include a spool formed of a core wall around a core and passages extending through the core wall. The spool also includes an upper flange located at an upper portion of a central section composed of the core wall, a lower flange located at a lower portion of the central section, in which an opening extends through the lower flange and into the core, and a protrusion section integral with the central section and extending above the upper flange. The protrusion section includes a cut-out formed inside the protrusion section, the cut-out having a non-circular shape to securely hold a head of a fastener and a mating element formed at an upper surface of the protrusion section to interconnect with a knob.

The spool assemblies may also include an end cap that is to be inserted into the core through the opening that extends through the lower flange of the spool. The end cap includes a protrusion that extends from one side of the end cap to the other side of the end cap and includes a passageway that extends through the protrusion and is to be aligned with the passages in the core wall. The passageway in the end cap is to align with the passages in the core wall when the end cap is inserted into the core. The end cap may provide a support surface upon which a spring may contact to bias an interior of a spool housing into contact with the spool assembly. Additionally, alignment of the passageway in the end cap with the passages in the spool enables a cutting line to be inserted from one side of the spool to the other side of the spool.

In an operational state in which the spring is in an extended position, detents on the spool are to engage stoppers on the spool housing such that the engagement enables the housing to rotate with rotation of the spool. In another operational state in which the spring is in a compressed position, the detents may be disengaged from the stoppers and the spool may rotate freely from the spool housing. The detents are ramped to enable the spool to be rotated in a certain direction without also rotating the housing. The certain direction is a direction that is counter to a normal operating direction of the spool, i.e., the normal direction may be the direction in which the spool rotates during cutting or trimming operations.

According to some embodiments, the spool assemblies disclosed herein also include a pawl and a knob, in which the pawl is coupled to the spool and the knob is able to rotate independently from the pawl in one direction and to rotate with the pawl in an opposite direction. The pawl and the knob include mating engagement elements that enable the spool to be rotated in the certain direction in a ratcheting motion. That is, the mating engagement elements along with the ramped detents and the stoppers cause rotation of the knob in the certain direction to result in the spool rotating in the certain direction and rotation of the knob in a direction opposite the certain direction does not cause the spool to rotate with the knob. In one regard, the pawl and knob disclosed herein may enable the spool to be rotated in the certain direction through a ratcheting action, which may be simpler and more efficient than continuously turning the knob in one direction. The spool may be rotated in the certain direction during a cutting line winding operation in which a cutting line is wound onto the spool.

Before continuing, it is noted that as used herein, the terms "includes" and "including" mean, but are not limited to, "includes" or "including" and "includes at least" or "including at least." The term "based on" means, but is not limited to, "based on" and "based at least in part on."

With reference first to FIG. 1, there is shown a perspective view of a string trimmer 100 according to an example. It should be understood that the string trimmer 100 depicted in FIG. 1 may include additional components and that some of the components described herein may be removed and/or modified without departing from a scope of the string trimmer 100 disclosed herein.

The string trimmer 100 is depicted as including an upper housing 102 that houses a battery and/or a motor. In examples in which the upper housing 102 houses a battery, a wire may be connected to the battery and may extend through a shaft 104 (or along an exterior of the shaft 104) to a trimmer head housing 106. In examples in which the upper housing 102 houses a motor, a drive shaft may be connected to the motor and may extend through the shaft 104 to the trimmer head housing 106. In any of these examples, a trigger or switch 108 on a main handle 109 and an auxiliary handle 110 may be provided along the shaft 104 to enable an operator to control the operation and position of the string trimmer 100.

With reference now to FIG. 2, there is shown a side view of the trimmer head housing 106 and the trimmer head 112 depicted in FIG. 1. In the example shown in FIGS. 1 and 2, the upper housing 102 houses a battery and the trimmer head housing 106 includes a motor assembly 114 that includes a motor housing 116 and a motor support 118. The motor support 118 may be fastened to the shaft 104 and may support the motor housing 116 and the motor housing 116 may house a motor 119 (shown in FIG. 4A). Additionally, the trimmer head 112 may be attached to a drive member of the motor assembly 114 and includes a spool housing 115 as described in greater detail herein. The trimmer head housing 106 may also include a guard 120 that extends around at least a portion of the trimmer head 112.

Figure 4A:
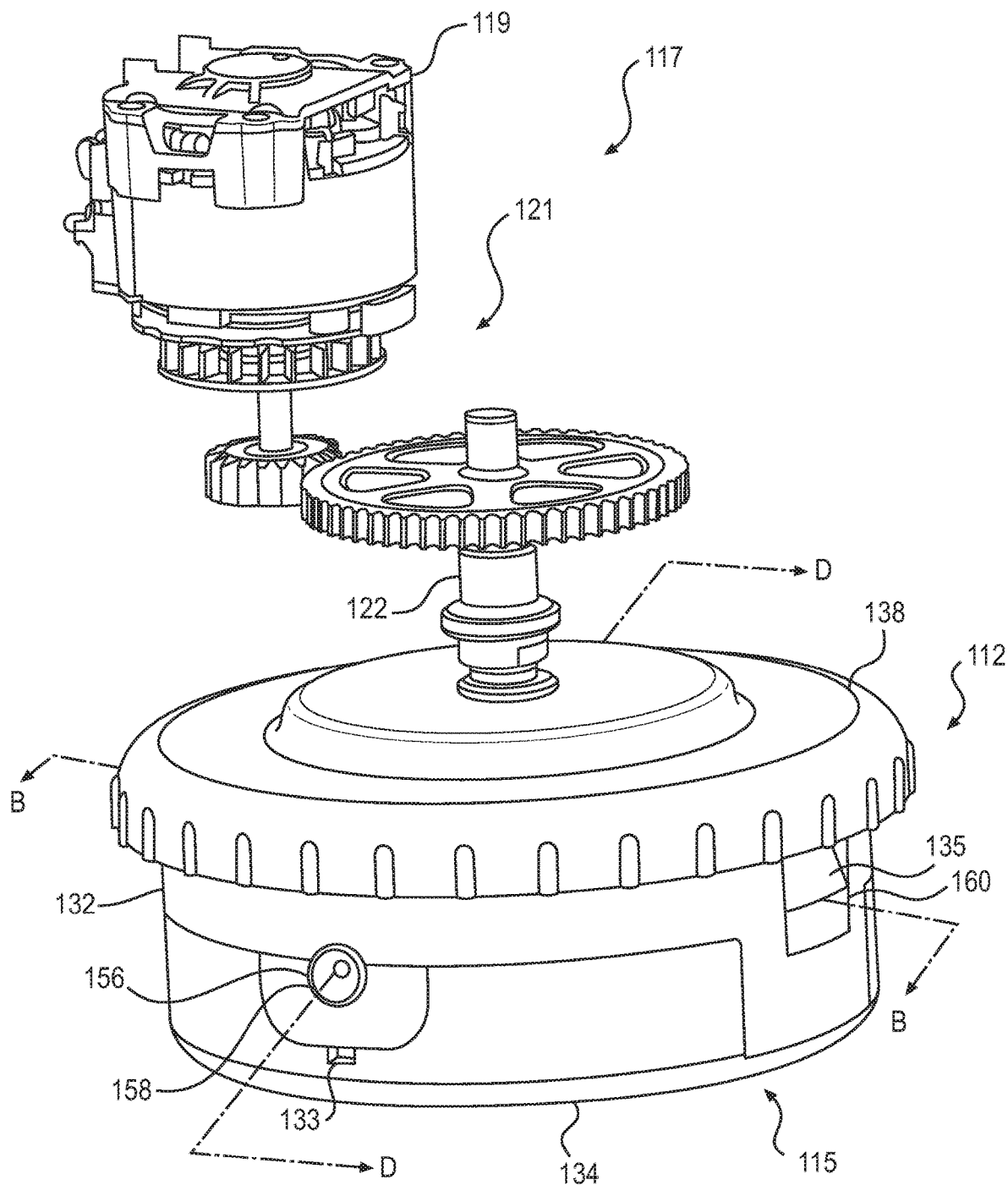
FIG. 4A shows a perspective view of the trimmer head depicted in FIGS. 1-3 and a powertrain of the motor assembly depicted in FIG. 2.
Figure 4B:
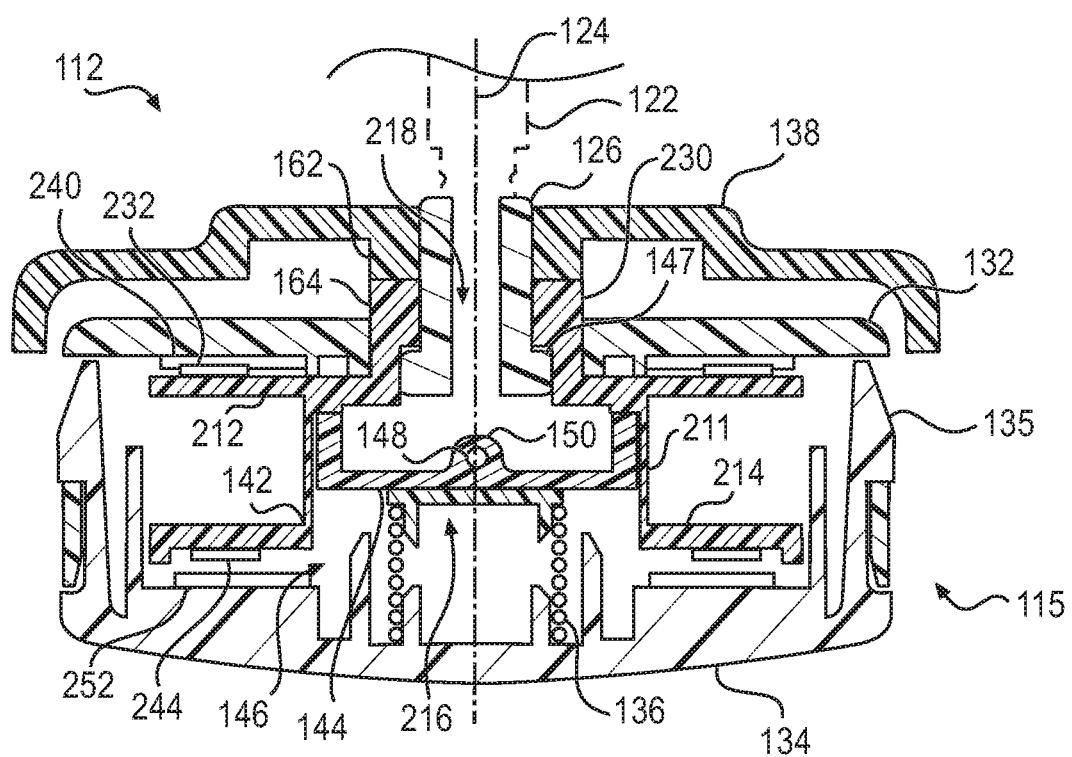
FIGS. 4B and 4C, respectively, depict cross-sectional side views of the trimmer head taken along line B-B in FIG. 4A in two stages of operation.
Figure 4C:
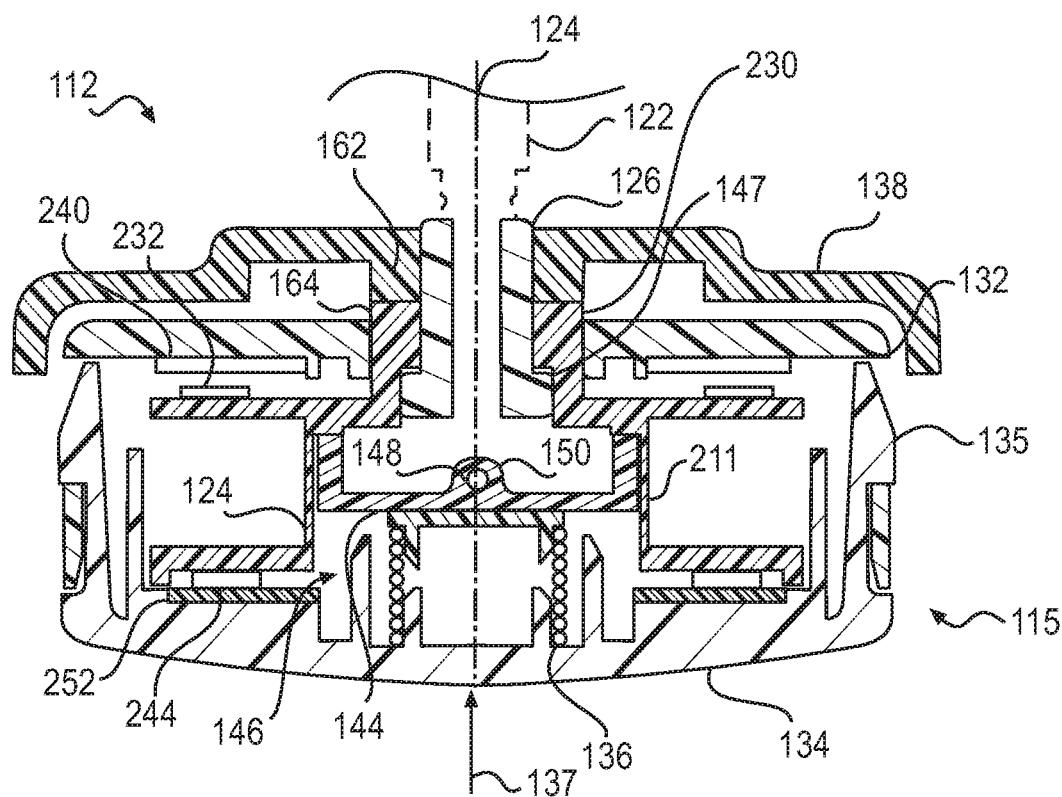
Figure 4D:
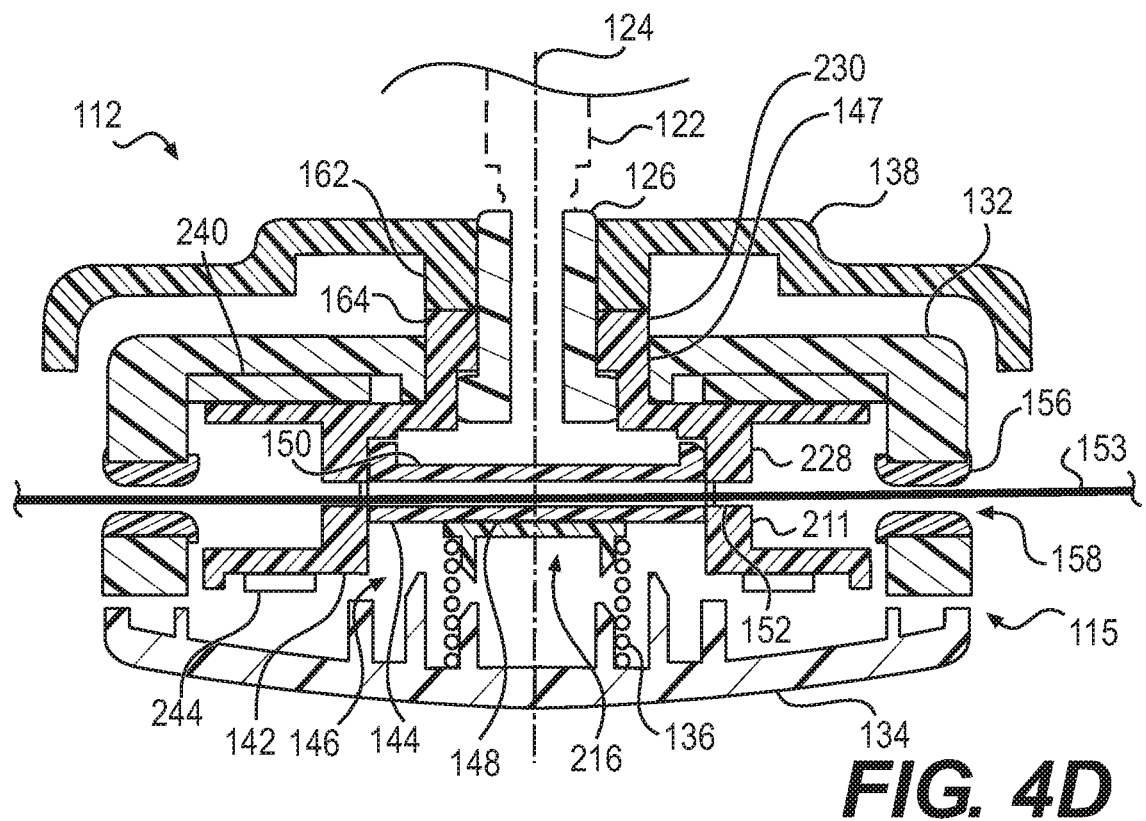
FIG. 4D depicts a cross-sectional side view of the trimmer head taken along line D-D in FIG. 4A.

Particular reference is now made to FIGS. 3 and 4A-4D. FIG. 3 shows a perspective view of the trimmer head housing 106 and an exploded perspective view of the trimmer head 112 depicted in FIGS. 1 and 2. FIG. 4A shows a perspective view of the trimmer head 112 depicted in FIGS. 1-3 and a powertrain 117 of the motor assembly 114. FIGS. 4B and 4C, respectively, show cross-sectional side views of the trimmer head 112 taken along line B-B in in FIG. 4A in two stages of operation. FIG. 4D shows a cross-sectional side view of the trimmer head 112 taken along line D-D in FIG. 4A.

As shown in FIGS. 3, 4A, and 4B, the powertrain 117 includes a drive member 122 that the motor 119 contained in the motor housing 116 rotates through a gear assembly 121 connected between the motor 119 and the drive member 122. The drive member 122 may include threads to threadedly engage a bolt 126 that is to couple a spool assembly 130 to the drive member 122 such that the spool assembly 130 is rotated about an axis 124 during rotation of the drive member 122.

The trimmer head 112 is depicted as including a spool assembly 130, the spool housing 115 (depicted as a top housing component 132 and a bottom housing component 134), a spring 136, and a knob 138. The spool assembly 130 is depicted as including a spool 142 and may also include an end cap 144 that is to be inserted into an opening 146 of the spool 142. The end cap 144 is inserted into the opening 146 after the bolt 126 is inserted through the opening 146 and engaged with the threads on the drive member 122. An upper portion of the spool 142 includes features such as a cut-out 147 that is shaped to hold the bolt 126 as shown in FIG. 4B. The cut-out 147 and the head of the bolt 126 may both have non-circular shapes such that the head of the bolt 126 may securely be held within the spool 142 and rotation of the bolt 126 causes the spool 142 to rotate. The cut-out 147 in the spool 142 may hold the head of the bolt 126 in place while a portion of the bolt 126 protrudes through the upper portion of the spool 142. In this regard, the bolt 126 is to be engaged with both the drive member 122 and the spool 142 to thus cause the spool 142 to rotate concurrently with the drive member 122. As shown, a portion of the drive member 122 and a portion of the bolt 126 extends through openings in the top housing component 132 and the knob 138.

The top housing component 132 and the bottom housing component 134 may be connected together to form the spool housing 115 around the spool assembly 130. For instance, and as shown in FIGS. 3, 4A, and 4B, the bottom housing component 134 may include tabs 135 that are inserted into mating slots 160 on the top housing component 132. The spool housing 115 surrounds the spool assembly 130 and releasably engages the spool 142. Particularly, the end cap 144 may be inserted into the opening 146 such that a passageway 148 formed in a protrusion 150 of the end cap 144 aligns with passages 152 in the spool 142. The end cap 144 may include a support surface 154 upon which the spring 136 is to contact. When the bottom housing component 134 and the top housing component 132 are connected together around the spool assembly 130 as shown in FIG. 4B, the spring 136 applies force onto the support surface 154 that is directed away from the bottom housing component 134. In other words, the spring 136 applies force onto the support surface 154 to cause the spool assembly 130 to be pushed toward the upper housing component 132. Although the spring 136 is shown contacting the end cap 144, the spring 136 may contact other parts of the spool 142 to urge the spool housing 115 downward and still fall within the scope of the invention.

When no forces are applied to the spool housing 115, the spring 136 urges the spool housing 115 in a downward direction relative to the spool 142, so that portions of an upper surface of the spool 142 are in contact with an interior surface of the top housing component 132 as shown in FIG. 4B. However, when a force is applied onto the bottom housing component 134, as represented by arrow 137, the spool housing 115 moves in an upward direction causing the spring 136 to compress as shown in FIG. 4C so that the top housing component 132 moves away from the spool 142 and is no longer in contact with the upper surface of the spool 142. In other words, the spring 136 normally biases the spool housing 115 downward to lockingly engage the top housing component 132 with the spool 142, but when a force is applied to the bottom of the spool housing 115 the spool assembly 130 is separated from the spool housing 115 and may rotate freely from the spool housing 115.

Figure 6A:
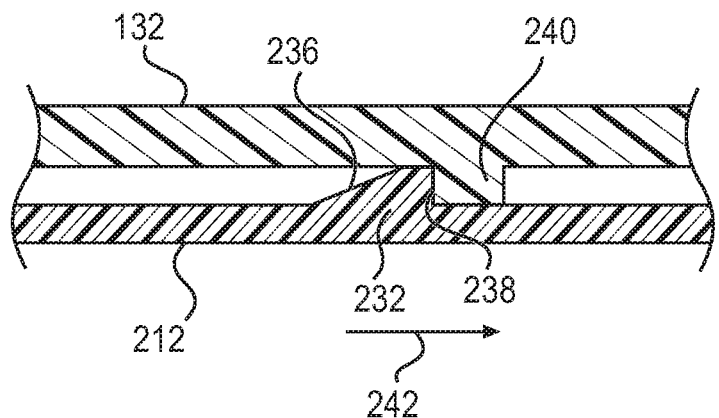
FIG. 6A depicts a cross-sectional side view of an interaction between detents on a spool and stoppers on a top housing component according to an example of the present disclosure.

As discussed in greater detail herein with respect to FIGS. 5A, 5B, and 6A, the upper surface of the spool 142 includes detents and the inner surface of the top housing component 132 includes stoppers to enable the spool housing 115 to rotate with the spool 142 when the detents and stoppers are in engaging contact with each other and for the spool 142 to rotate independently from the spool housing 115 when the detents and stoppers are not in engaging contact with each other. Thus, in the arrangement shown in FIG. 4B, the spool housing 115 rotates when the spool 142 rotates and in the arrangement shown in FIG. 4C, the spool housing 115 does not rotate when the spool 142 rotates. The spool assembly 130 and an interface between the spool 142 and the top housing component 132 are respectively depicted in FIGS. 5A, 5B, and 6A. In other examples, the upper surface of the spool 142 may include stoppers and the inner surface of the top housing component 132 may include detents without departing from a scope of the invention.

With particular reference to FIGS. 5A-5C, there are respectively shown a bottom perspective view of the spool assembly 130 shown in FIGS. 3 and 4B-4D, a top perspective view of the spool 142 shown in FIGS. 3 and 4B-4D, and a top perspective view of the end cap 144 shown in FIGS. 3 and 4B-4D. As discussed above, the spool assembly 130 includes the spool 142 and may include the end cap 144. The spool 142 and the end cap 144 may be fabricated of any suitable material such as plastic, polymer, metal, or combinations thereof. Additionally, the spool 142 and the end cap 144 may each be fabricated as monolithic structures, for instance, through 3D printing, injection molding, etc.

The spool 142 is depicted as including a central section 210, an upper flange 212, and a lower flange 214. The upper flange 212 is depicted as being located at an upper portion of the central section 210 and the lower flange 214 is depicted as being located at a lower portion of the central section 210. Additionally, the central section 210 is depicted as including a core wall 211 surrounding a core 216 that includes an opening 146 that extends through the lower flange 214 to expose the core 216. The upper flange 212 also includes an opening 218 that is shaped to hold a head of a bolt 126 (as shown in FIG. 4B).

The end cap 144 may have a similar shape and size as the opening 146 and may be inserted into the core 216. The end cap 144 may include a support surface 154 to contact the spring 136 as discussed above with respect to FIGS. 4B and 4C. As shown in FIGS. 4D and 5C, the end cap 144 also includes a protrusion 150 extending in a direction opposite the support surface 154, in which the protrusion 150 includes a passageway 148 that extends from one side of the end cap 144 to the other side of the end cap 144. The passageway 148 is aligned with the passages 152 provided in the core wall 211 of the central section 210. Particularly, in FIG. 4D, the passages 152 are depicted as extending through raised sections 228 formed on the core wall 211, e.g., integrally formed with the core wall 211. The passageway 148 generally enables a cutting line to be fed from one side of the spool 142 to the other side of the spool 142 through the core 216.

As shown in FIG. 5A, the passageway 148 terminates on opposite sides of the protrusion 150. Additionally, alignment elements 220 may be provided on the two opposing tabs 221. The alignment elements 220 are to be inserted into matching recesses 222 that extend into the core 216 of the spool 142. The alignment elements 220 and the matching recesses 222 may prevent the end cap 144 from being inserted into the core 216 unless the alignment elements 222 are properly aligned with the matching recesses 222. As such, the alignment elements 220 and the matching recesses 222 may prevent the tabs 221 from blocking the passages 152 when the end cap 144 is inserted into the core 216. Instead, the alignment elements may only enable the end cap 144 to be inserted into the core 216 with the passageway 148 being properly aligned with the passages 152 in the spool 142.

As shown in FIGS. 4D and 5B, the central section 210 may include raised portions 228 at which the passages 152 may be formed. The raised portions 228 generally position the passages 152 in closer proximity to the respective holes 158 in the spool housing 115 to make insertion of a cutting line into the passages 152 easier. In other examples, the raised portions 228 may be omitted. As also shown, a protrusion section 230 extends from the upper flange 212 and includes mating elements 164 that are to interconnect with elements 162 on the knob 138 to thus cause the knob 138 to rotate with the spool 142 and vice versa.

Figure 6B:
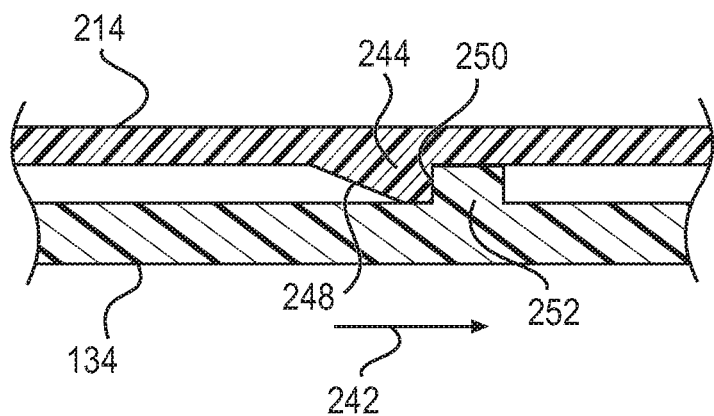
FIG. 6B depicts a cross-sectional side view of an interaction between detents on a spool and stoppers on a bottom housing component according to an example of the present disclosure.
Figure 6C:
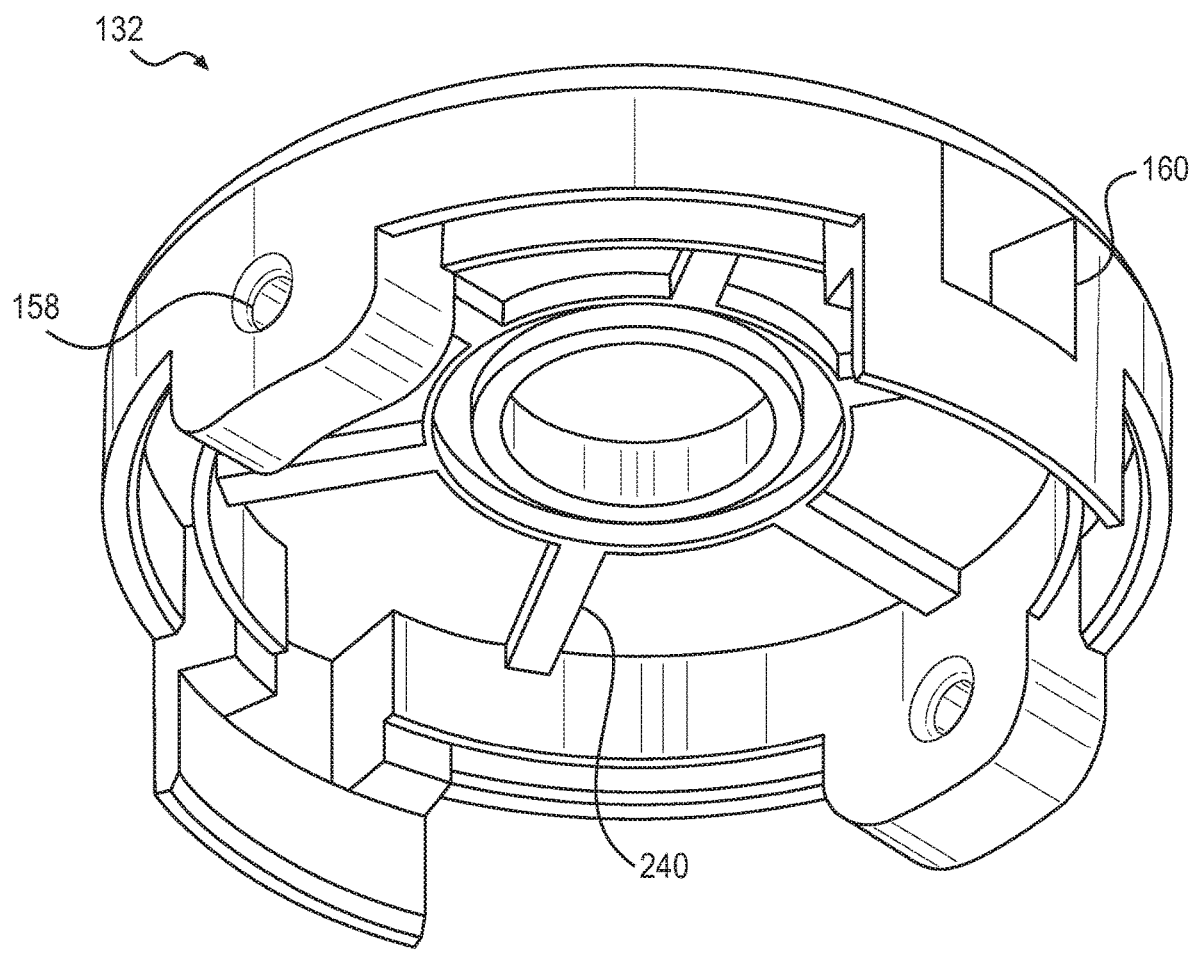
FIG. 6C depicts a perspective view of a top housing component according to an example of the present disclosure.

According to examples, a plurality of detents 232 are formed on an upper surface 234 of the upper flange 212. The detents 232 include a ramp portion 236 and a vertical portion 238. As shown in FIGS. 6A and 6C, the vertical portions 238 of the detents 232 are to engage stoppers 240 on the top housing component 132. Particularly, the top housing component 132 may include a plurality of stoppers 240 radially spaced from each other at distances similar or equal to the distances at which the detents 232 are spaced from each other. In any regard, the arrangement between the top housing component 132 and the upper flange 212 may be similar to the arrangements shown in FIGS. 4B and 4D. That is, the vertical portions 238 of the detents 232 may engage the stoppers 240 when the spring 236 biases the spool housing 115 downward such that the interior of the top housing component 132 contacts the spool 142.

Generally speaking, when the spool 142 is rotated in the direction indicated by the arrow 242 (FIG. 6A), the spool housing 115 also rotates in that direction. However, when the spool 142 is rotated in a direction opposite the direction indicated by the arrow 242, the spool housing 115 does not rotate with the spool 142. Instead, the spool 142 may rotate freely from the spool housing 115. That is, as the spool 142 is being rotated counter to the direction of the arrow 242, the stoppers 240 may slide up the ramp portions 236. The arrow 242 may denote the direction at which the spool 142 and thus, the spool housing 115, rotates during a normal trimming operation. Likewise, the spool 142 may be rotated in the direction counter to the arrow 242 to wind new cutting line onto the spool 142, e.g., by rotating the knob 138 in the direction counter to the arrow 242.

Additionally, the cutting line 153 may automatically be fed out of the spool 142 by bumping the bottom housing component 134 while the spool 142 is being rotated in the direction indicated by the arrow 242. That is, bumping the bottom housing component 134 may cause the spool 142 to be separated from the top housing component 132 as discussed above with respect to the FIG. 4C, which may cause the detents 232 to be briefly disengaged from the stoppers 240. The detents 232 may then re-engage the stoppers 240 as the spool 142 continues to rotate in the direction 242 and the top housing component 134 is biased downward by the spring 136. The relative rotation between the spool 142 and the spool housing 115 during the brief disengagement may cause as a portion of the cutting line 153 wound on the spool 142 to be fed out of the spool housing 115. The cutting line 153 may also be manually unwound from the spool 142 through application of sufficient force on the bottom housing component 134 to cause the top housing component 132 to disengage from the spool 142 and pulling of the cutting line 153.

As also shown in FIG. 5A, a plurality of detents 244 may be formed on a bottom surface 246 of the lower flange 214. Similar, to the detents 232, the detents 244 include a ramp portion 248 and a vertical portion 250. As shown in FIG. 6B, the vertical portions 250 of the detents 244 are to engage stoppers 252 on the bottom housing component 134. Particularly, the bottom housing component 134 may include a plurality of stoppers 252 radially spaced from each other at distances similar or equal to the distances at which the detents 244 are spaced from each other. The arrangement of the stoppers 252 may be similar to the stoppers 240 on the top housing component 132 as shown in FIG. 6C. In any regard, the arrangement between the bottom housing component 134 and the bottom flange 214 may be similar to the arrangement shown in FIG. 4C. That is, the vertical portions 250 of the detents 244 may engage the stoppers 252 when the bottom housing component 134 is pressed toward the spool assembly 130. According to examples, the detents 244 and the stoppers 252 may prevent the spool 142 from uncontrollably unwinding during automatic cutting line 153 feeding when the bottom of the spool housing 115 is bumped.

In the descriptions above, particular reference has been made to the detents 232 being formed on the upper flange 212 and the stoppers 240 being formed on the top housing component 132 or the detents 232, 244 being formed on both the upper flange 212 and the lower flange 214. In other examples, the detents 244 are formed on the lower flange 214 and the stoppers 252 are formed on the bottom housing component 134 without also having the detents 232 formed on the upper flange 212. In these examples, the spring 136 is provided between the upper flange 212 and the top housing component 132 to normally bias the spool housing 115 upward. In addition, or in other examples, the detents 232 and/or 244 are formed on the spool housing 115 and the stoppers 240, 252 are formed on the spool 142.

Figure 7:
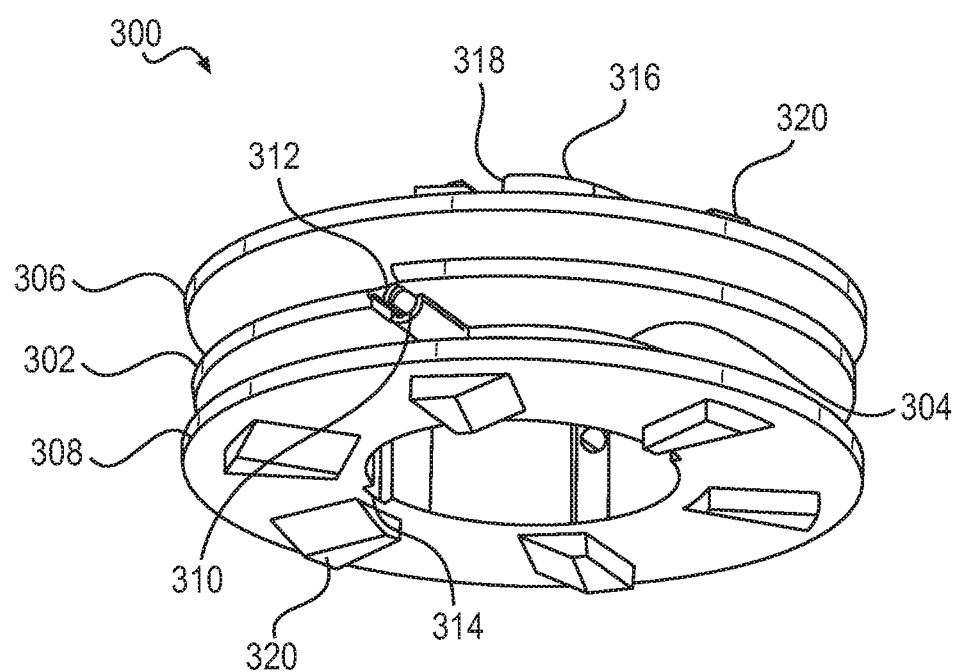
FIG. 7 depicts a perspective view of a spool according to another example of the present disclosure.

In still other examples, the spool 142 may have alternate configurations. For instance, a perspective view of a spool 300 according to another example is depicted in FIG. 7. Generally speaking, the spool 300 may be used in place of the spool 142 in the trimmer head 112 shown in FIGS. 1-4D. As shown, the spool 300 differs from the spool 142 depicted in FIGS. 5A and 5B in that the spool 300 includes a middle flange 302 located on a central section 304 between an upper flange 306 and a lower flange 308. In some examples, the middle flange 302 is centrally located between the upper flange 306 and the lower flange 308. In these examples, a passage 310 that extends through a wall of the central section 304 may be provided in gaps between portions of the middle flange 302. Similar to the passages 152 in the spool 142, the passage 310 may extend through the central section 304 of the spool 300. Additionally, the passage 310 may be formed on protrusions 312 and portions of the middle flange 302 may begin and terminate on opposite sides of the protrusions 312, e.g., may be offset from each other. The portions of the middle flange 302 may also begin and terminate at different heights with respect to each other on the protrusions 312 as shown in FIG. 7. In other examples, the middle flange 302 is not centrally located between the upper flange 306 and the lower flange 308. In any regard, a cutting line may be wound around the central section 304 both above and below the middle flange 302.

The spool 300 may also include additional features similar to the features depicted in the spool 142. For instance, the spool 300 includes recesses 314 into which alignment elements 220 of an end cap 144 may be inserted. The spool 300 also includes a protrusion 316 and mating elements 318 to mate with elements 162 on the knob 138. The spool 300 further includes ramped detents 320 on either or both of the upper flange 306 and the lower flange 308 to engage stoppers 240 on either or both of the top housing component 132 and the bottom housing component 134.

With reference back to FIG. 4D, a cutting line, cord, or string (which is referenced herein as cutting line 153) may extend through the passages 152 in the spool 142 and the passageway 148 in the end cap 144 and is to be wound around the spool 142. The cutting line 153 is also to extend through eyelets 156 inserted in holes 158 in the top housing component 132 as shown in FIGS. 3 and 4D. The eyelets 156 may be formed of metal and may guide the cutting line out of the top housing component 132. The eyelets 156 may also protect the top housing component 132 from the cutting line 153. In other examples, the holes 158 may be formed in the bottom housing component 134. In addition, a window 133 may be provided in either or both of the top and bottom housing components 132, 134 to enable the spool 142 and the cutting line 153 to be visible from outside of the spool housing 115. A user may peer through the window 133 during a cutting line 153 insertion operation to align the passages 152 in the spool 142 with the eyelets 156. According to examples, the window 133 is provided in the bottom housing component 134 as shown in FIGS. 3 and 4A.

According to embodiments, the knob 138 includes elements 162 that are to engage with mating elements 164 on the spool 142 such that rotation of the knob 138 causes the spool 142 to rotate and vice versa. As shown in FIG. 4B, the knob 138 is elevated from the upper surface of the top housing component 132 such that the knob 138 is not in contact with the upper surface of the top housing component 132. As such, there is a sufficient gap between the knob 138 and the spool housing 115 to enable the spool housing 115 to move a sufficient distance to disengage the detents 232 on the spool 142 from the stoppers 240 on the top housing component 132 as shown in FIG. 4C.

According to examples, the knob 138 may be manually rotated to wind a cutting line 153 onto the spool 142. For instance, when cutting line 153 on the spool 142 has been used up, as shown in FIG. 4D, additional cutting line 153 may be inserted through the eyelet 156 in the top housing component 132, through the passage 152 on one side of the spool 142, e.g., by first aligning the passage 152 with the eyelets 156, through the passageway 148 in the end cap 144, through the passage 152 on the other side of the spool 142, and through the eyelet 156 on the opposite side of the top housing component 115. The knob 138 may include a marking that may be matched to a marking on the spool housing 115 to enable a user to align the eyelets 156 with the passages 152 by aligning the markings on the knob 138 and the spool housing 115. The cutting line 153 may be inserted such that equal lengths of the cutting line 153 extend out of opposing eyelets 156 in the spool housing 115. In addition, the knob 138 may be rotated in a direction opposite the direction of rotation during which trimming operations are performed. As discussed in greater detail herein with respect to FIG. 6A, rotation of the knob 138 in this direction causes the spool 142 to rotate independently of the spool housing 115, thus enabling the cutting line 153 to be wound onto the spool 142.

Figure 8:
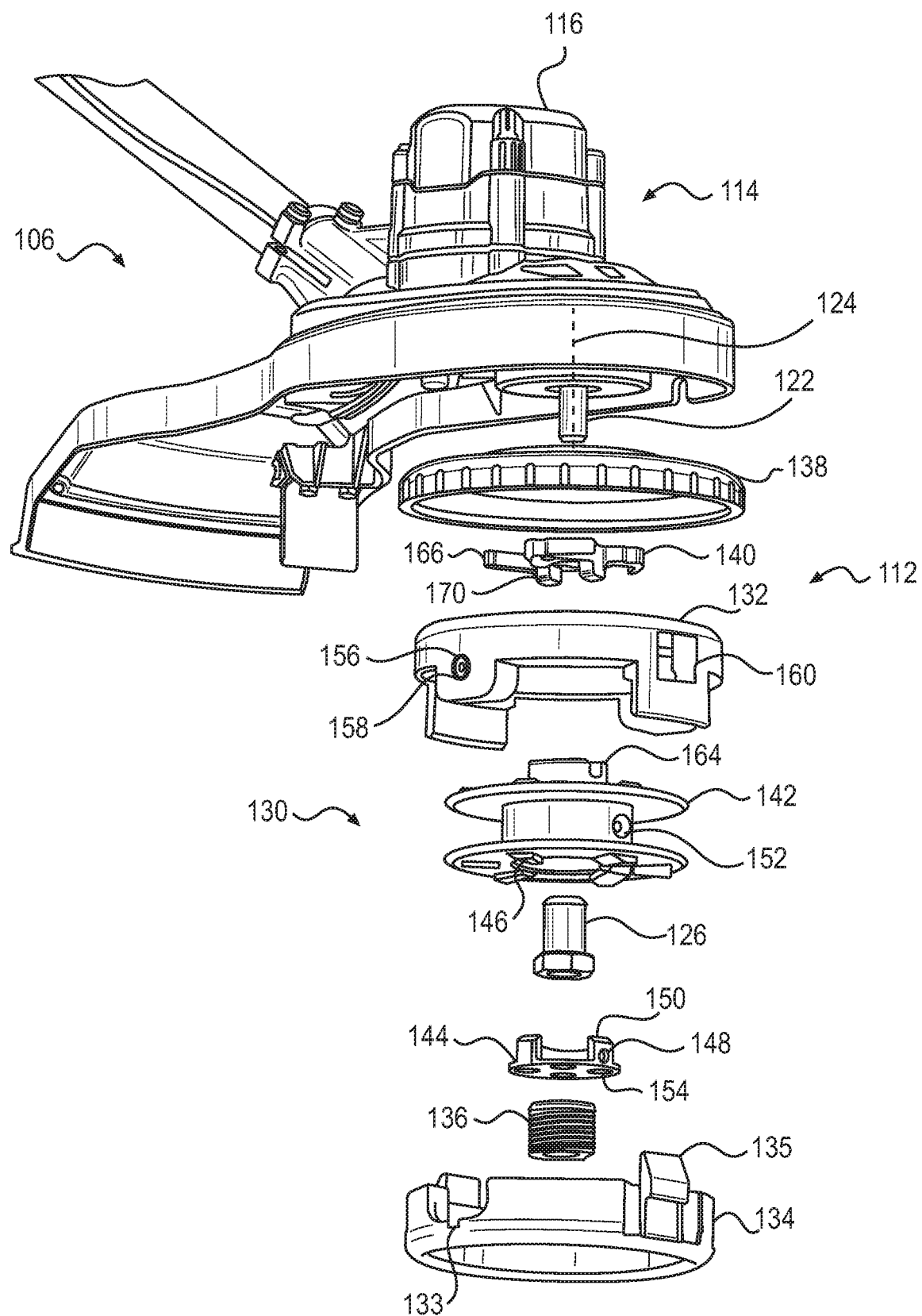
FIG. 8 depicts a perspective view of the trimmer head housing and an exploded perspective view of the trimmer head shown in FIGS. 1 and 2 according to another embodiment.
Figure 9:
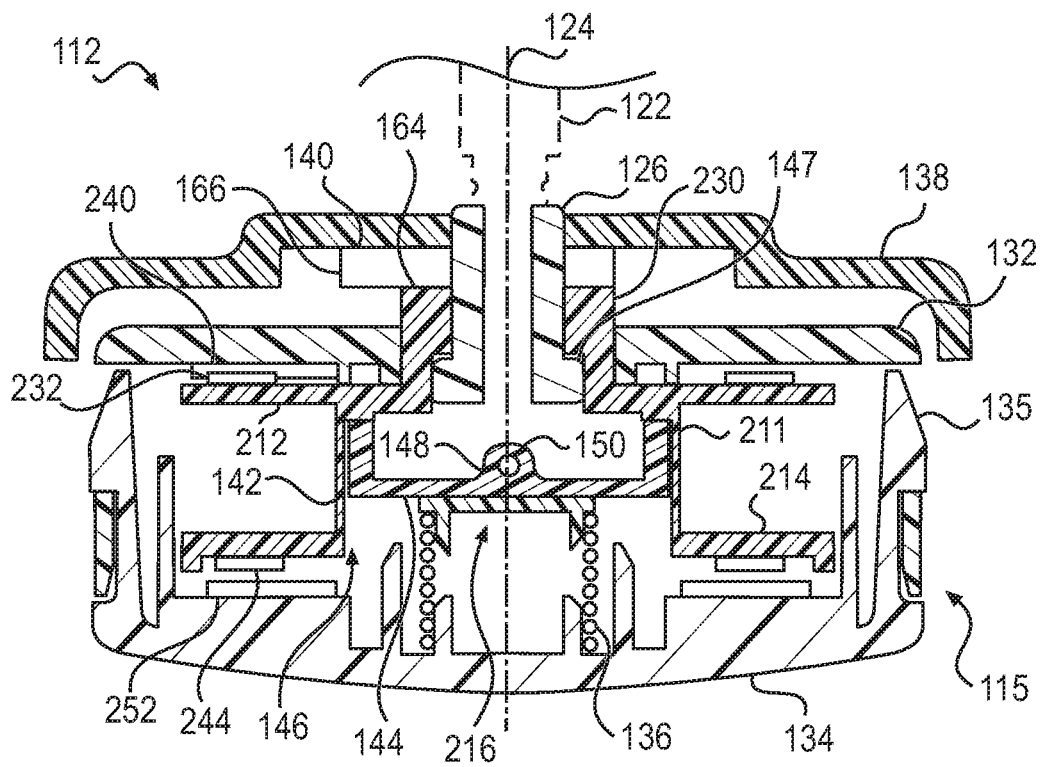
FIG. 9 depicts a cross-sectional side view of the trimmer head taken along line B-B in FIG. 4A according to another embodiment.
Figure 10:
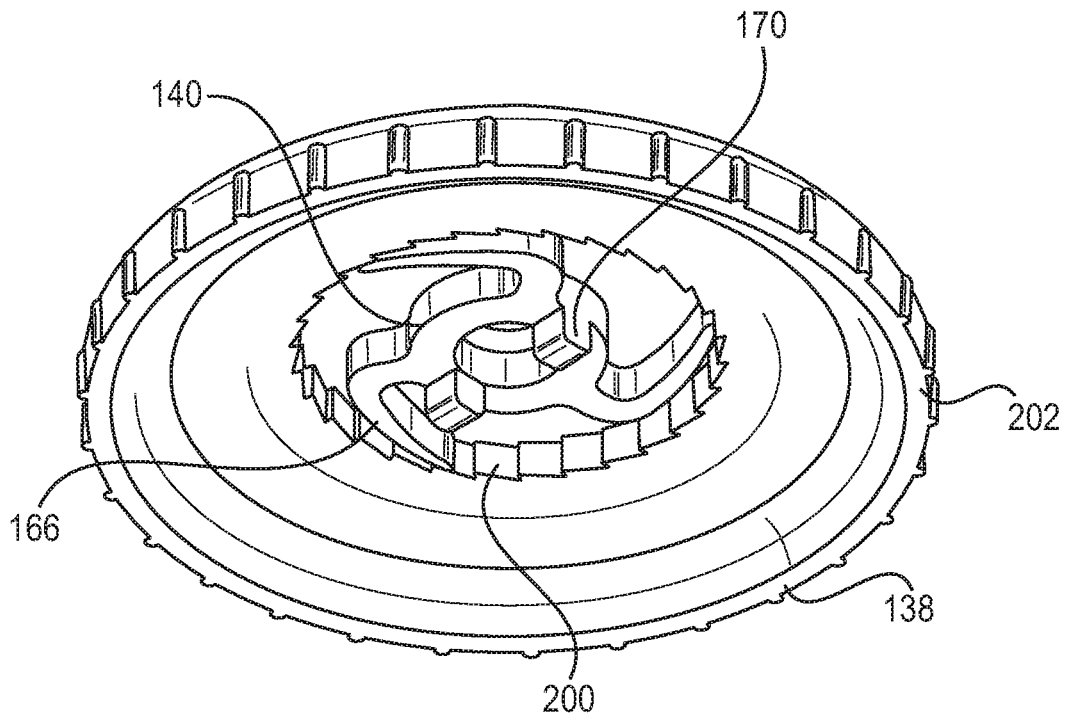
FIG. 10 depicts a perspective view of the pawl and the knob depicted in FIGS. 8 and 9.

According to other embodiments, the knob 138 may be rotated in a ratcheting motion with a pawl 140 to wind the cutting line 153 onto the spool 142. These examples are described with respect to FIGS. 8-10. FIG. 8 shows a perspective view of the trimmer head housing 106 and an exploded perspective view of the trimmer head 112 depicted in FIGS. 1 and 2 with the addition of the ratcheting mechanism. FIG. 9 shows a cross-sectional view of the trimmer head 112 depicted in FIGS. 1-3 taken along line B-B in FIG. 4A with the addition of the ratcheting mechanism. FIG. 10 illustrates a perspective view of the pawl 140 engaged with the knob 138 depicted in FIGS. 8 and 9. FIG. 8 depicts features similar to those features depicted in FIG. 3 and FIG. 9 shows features similar to those features depicted in FIG. 4B. Accordingly, only those features in FIGS. 8-10 that respectively differ from FIGS. 3 and 4B are described in detail with respect to FIGS. 8-10.

As shown in FIGS. 8-10, in addition to the elements described with respect to FIGS. 3 and 4B, the trimmer head 112 is depicted as including the pawl 140. That is, the pawl 140 is depicted as being positioned between the top housing component 132 and the knob 138. In addition, the drive member 122 and/or the bolt 126 extend through openings in the knob 138 and the pawl 140. Moreover, the pawl 140 includes elements 170 to mate with mating elements 164 on the spool 142. Thus, instead of the knob 138 including elements 162 to mate with the mating elements 164 on the spool 142, the pawl 140 is mated with the spool 142.

As shown in FIGS. 8-10, the pawl 140 includes arms 166 that are to engage teeth 200 formed in a bottom surface of the knob 138 (FIG. 10). The teeth 200 have angled sections to enable the pawl 140 to be rotated in a first direction while preventing the pawl 140 from rotating in a second direction with respect to the knob 138. As such, the arms 166 on the pawl 140 engage the teeth 200 to enable a ratcheting operation to be performed through rotation of the knob 138. The knob 138 may also include protrusions 202 that may improve a user's grip on the knob 138 and may thus facilitate manual rotation of the knob 138. The knob 138 and the pawl 140 may be fabricated of any suitable material such as plastic, polymer, metal, or combinations thereof. In other examples, the knob 138 and the pawl 140 include other elements other than arms 166 and teeth 200 in which the other elements enable the ratcheting motion.

Generally speaking, the teeth 200 in the knob 138 and the arms 166 on the pawl 140 enable the knob 138 to be rotated in a first direction in which the pawl 140 is engaged with and rotates with the knob 138, which causes the spool 142 to rotate. This direction may be a direction that is opposite the direction of rotation during which trimming operations are performed. Once the knob 138 has been rotated for a partial turn, the knob 138 may be rotated in a second direction in which the knob 138 rotates independently of the pawl 140 and thus, independently of the spool 142. In this regard, the cutting line 153 may be wound onto the spool 142 without a user releasing his or her grip on the knob 138, which may simplify and speed up winding of the cutting line onto the spool 142.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A spool assembly comprising:
 a spool formed of:
  a central section including a core wall containing a core and passages extending through the core wall;
  an upper flange located at an upper portion of the central section;
  a lower flange located at a lower portion of the central section;
  a protrusion section integral with the central section and extending above the upper flange, the protrusion section including a cut-out formed inside the protrusion section, the cut-out having a non-circular shape adapted to be securely engaged to a drive member of a motor; and an end cap to be inserted into an opening into the core, the end cap having a protrusion that extends from one side of the end cap to the other side of the end cap and includes a passageway that extends through the protrusion and is to be aligned with the passages in the core wall.

2. The spool assembly according to claim 1, wherein the spool further includes raised portions extending from the core wall and wherein the passages are formed through the raised portions.

3. The spool assembly according to claim 1, further comprising:
a plurality of detents formed on the upper flange, wherein the plurality of detents are to releasably engage with mating elements in a housing section to enable rotation of the spool assembly with respect to the housing section in one direction while preventing rotation of the spool assembly with respect to the housing section in an opposite direction.

4. The spool assembly according to claim 1, wherein the spool further includes a middle flange located on the central section between the upper flange and the lower flange.

5. The spool assembly according to claim 4, wherein the middle flange includes gaps adjacent to the passages and wherein opposite sections of the middle flange are offset from each other.

6. The spool assembly according to claim 1, wherein the end cap further comprises a plurality alignment members that are to engage with matching recesses in the central section during insertion of the end cap into the opening to align the passageway in the end cap with the passages in the central section.

7. A string trimmer head comprising:
a spool adapted to be coupled to a drive member of a string trimmer and to be continuously rotated with the rotation of the drive member around an axis, the spool having a central section formed of a core wall around a core and passages extending through the core wall, an upper flange located at an upper portion of the central section, and a lower flange located at a lower section of the central section;
an end cap inserted into an opening to the core, the end cap having a protrusion that extends from one side of the end cap to the other side of the end cap and includes a passageway that is aligned with the passages in the core wall;
a spool housing surrounding the spool and to releasably engage the spool, wherein the spool housing is to rotate with the spool when engaged with the spool and to not rotate with the spool when disengaged from the spool, the spool housing including an eyelet through which a line wound around the spool is to extend;
a spring to control the releasable engagement between the spool housing and the spool, wherein the spring is to bias the spool housing away from the spool; and
a protrusion section integral with the central section and extending above the central section, wherein a cut-out is formed in an interior of the protrusion section to securely hold a head of a fastener for driving connection to a drive member of a motor.

8. The string trimmer head according to claim 7, further comprising:
a knob, wherein the protrusion section includes mating elements that interconnect with the knob.

9. The string trimmer head according to claim 7, wherein the spool further includes raised portions extending from the core wall and wherein the passages are formed through the raised portions.

10. The string trimmer head according to claim 7, wherein the spool housing further comprises:
a window to enable viewing of the spool inside of the housing.

11. The string trimmer head according to claim 7, wherein the spool comprises first elements formed on the upper flange of the spool and the spool housing comprises second elements to contact the first elements, and wherein the second elements include stopping surfaces to contact the first elements when the housing is engaged with the spool and wherein the first elements are to slide along the second elements until the first elements contact the stopping surfaces.

12. The string trimmer head according to claim 7, wherein the spool comprises first elements formed on the lower flange of the spool and the spool housing comprises second elements to contact the first elements, and wherein the second elements include stopping surfaces to contact the first elements when the housing is engaged with the spool and wherein the first elements are to slide along the second elements until the first elements contact the stopping surfaces.

13. The string trimmer head according to claim 7, further comprising
a knob having a plurality of teeth; and
a pawl having protrusions to engage the teeth, wherein the teeth have angled sections to enable the pawl to rotate with respect to the knob in a first direction while preventing the pawl from rotating with respect to the knob in a second direction,
wherein the protrusion section includes mating elements that interconnect with the pawl, and
wherein the knob is to be rotated in a certain direction to wind a line around the spool by rotating the spool without rotating the spool housing, wherein the certain direction is counter to a direction in which the spool is rotated during a cutting operation.

* * * * *